United States Patent [19]

Marcolina

[11] Patent Number: 4,662,102

[45] Date of Patent: May 5, 1987

[54] DISPOSABLE RODENT TRAP

[76] Inventor: Gene A. Marcolina, 8803 Cheltenham Ave., Wyndmoor, Pa. 19118

[21] Appl. No.: 906,388

[22] Filed: Sep. 12, 1986

[51] Int. Cl.$^4$ ........................................... A01M 23/24
[52] U.S. Cl. ....................................................... 43/85
[58] Field of Search .................... 43/85, 61, 77, 81, 82

[56] References Cited

U.S. PATENT DOCUMENTS

| | | | |
|---|---|---|---|
| 1,186,408 | 6/1916 | Knights . | |
| 2,222,653 | 11/1940 | Chambless | 43/85 |
| 2,481,800 | 9/1949 | Tyler | 43/85 |
| 2,506,055 | 5/1950 | Benson | 43/85 |
| 2,669,056 | 2/1954 | Lehman | 43/79 |
| 2,869,280 | 1/1959 | Dobratz | 43/77 |
| 3,733,735 | 5/1973 | Hirsch | 43/61 |
| 4,070,787 | 1/1978 | Oakes | 43/94 |
| 4,142,320 | 3/1979 | Marcolina | 43/61 |
| 4,216,606 | 8/1980 | Kaiser et al. | 43/83 |
| 4,238,902 | 12/1980 | Holl | 43/61 |
| 4,363,184 | 12/1982 | Marcolina | 43/85 |
| 4,462,181 | 7/1984 | Broman | 43/61 |
| 4,569,149 | 2/1986 | Sensing et al. | 43/61 |

Primary Examiner—Gene P. Crosby
Attorney, Agent, or Firm—Howson and Howson

[57] ABSTRACT

In this disposable, molded rodent trap, two housing elements are hinged together in clamshell fashion and urged toward each other by an elastic band. An entrance to the housing is provided near the hinge, and a blade on one of the two elements cooperates with an opposed ridge on the other element to kill a rodent within the housing by choking. The two housing elements are held in a set condition by a narrow, elongated, transversely extending trigger element which is positioned to be gnawed by a rodent while its neck is between the blade and the opposed ridge. When the trigger element is gnawed through, the blade and opposed ridge come toward each other under the force of the elastic band, killing the rodent, which is substantially fully enclosed and can be thrown out along with the trap. The trigger may be molded as a unit with the housing parts. The trap is easily set and is not subject to triggering resulting from vibrations, trap movements or temperature changes.

10 Claims, 6 Drawing Figures

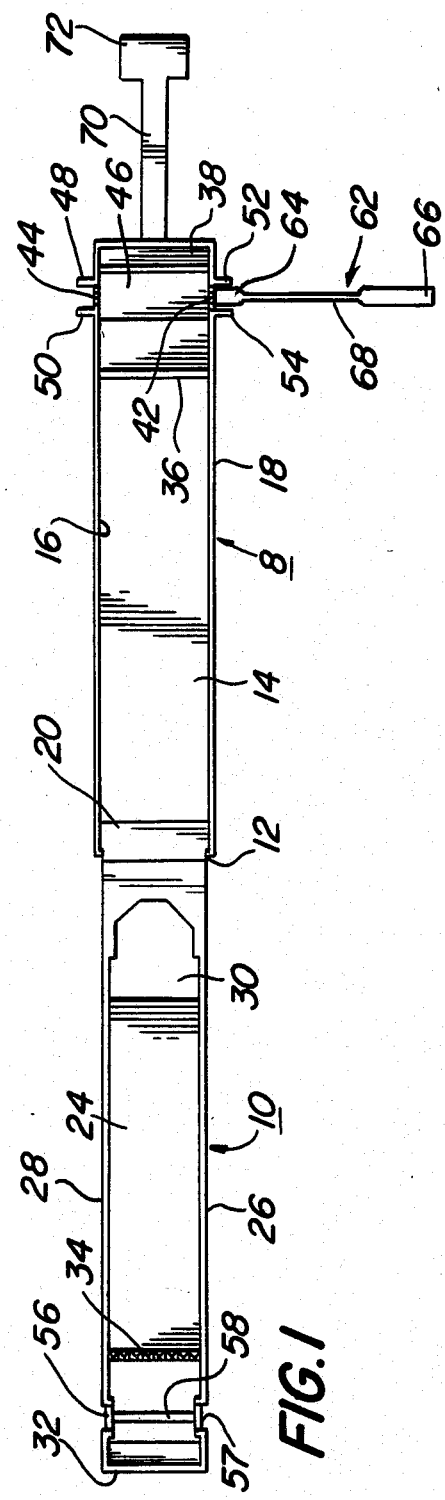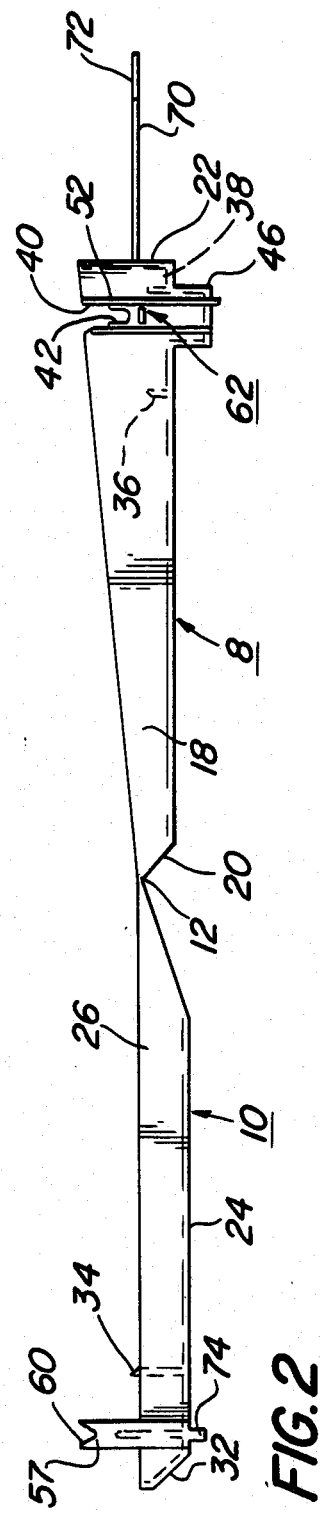

DISPOSABLE RODENT TRAP

BRIEF SUMMARY OF THE INVENTION

This invention relates to the trapping and killing of mice and other obnoxious rodents, and particularly to a trap designed for inexpensive manufacture and having a trigger with improved reliability.

Numerous rodent traps have been proposed in the past, and are exemplified by the following U.S. Pat. Nos: 1,186,408, Knights; 2,222,653, Chambless et al.; 2,481,800, Tyler; 2,506,055, Benson; 2,669,056, Lehman; 2,869,280, Dobratz; 3,733,735, Hirsch; 4,070,787, Oakes; 4,142,320, Marcolina et al.; 4,216,606, Kaiser et al.; 4,238,902, Holl et al.; 4,363,184, Marcolina; 4,462,181, Broman; 4,569,149, Sensing et al.

The Tyler, Sensing et al., Kaiser et al., Oakes, Benson and Lehman exemplify a class of traps which are designed to engage a rodent by the neck and kill it by choking. The devices for these patents depend on sensitive trigger mechanisms for their proper operation. In at least some instances, false triggering can occur as a result of externally caused vibrations, or temperature changes, or jarring of the trap by the rodent. Sensitive triggers also make rodent traps generally difficult to set.

The Marcolina et al., Holl et al. and Marcolina patents are representative of a class of traps made of molded synthetic polymers. In two cases, the traps kill the rodent by asphyxiation, and in the third, the rodent is killed by a blade mechanism movable with a wall of the trap. Injection molding makes it possible to manufacture these traps less expensively than other available traps, but, like the traps previously mentioned, they are all dependent on sensitive triggers for their proper operation.

The problem of trigger sensitivity has been addressed in a class of traps of which the Hirsch, Broman, Chambless et al., Knights and Dobratz patents are representative. In each of these patents, an edible bait is used as part of a trigger mechanism. In Chambless et al., Broman and Dobratz, a hard element of bait held in compression is used to maintain rodent-killing or rodent-enclosing elements apart. Entrapment and/or killing of the rodent takes place when the rodent gnaws through the bait. In each case, the size, shape, and hardness of the bait element are critical. In Hirsch and Knights, a trigger mechanism for releasing a closure is held set by the use of an element of bait to secure two separable elements of a trigger together. When the rodent gnaws through the bait, the trigger elements separate, and the closure operates to entrap the rodent. While in Hirsch and Knights, bait size, shape and hardness are not of great importance, the devices are somewhat more difficult to set in comparison with the traps of Broman, Chambless et al. and Dobratz.

The principal object of the present invention is to overcome the various problems associated with trigger sensitivity, difficulty of setting, and critical bait characteristics in the prior art, and to provide a rodent trap which is easy to use and highly reliable.

It is also an object of the invention to provide an easily used and reliable trap which is simple to manufacture and inexpensive.

The trap in accordance with my invention is, in its preferred form, similar to the trap described in my U.S. Pat. No. 4,363,184. In that patent, the trap comprises an elongated housing having an entrance opening at one end, and a hinged wall with a blade. The hinged wall is urged by an elastic band toward an opposite wall of the housing, but held in a set position by a mechanical trigger mechanism which is moved by the rodent as it attempts to reach bait inside the trap enclosure. The trigger must be sensitive in order for the trap to operate properly. When the trigger is released, the hinged wall moves inwardly toward an opposite wall, and the blade engages the rodent's neck. The rodent is instantly killed, and is encased in the trap housing which can be thrown away along with the dead rodent.

In the present invention, the trigger mechanism of my earlier patent is eliminated, and replaced by a novel trigger mechanism which comprises a narrow, elongated trigger element extending transversely in relation to the direction of relative movement of the movable trap elements. The narrow elongated element is placed at a location such that it can be gnawed through by the rodent when the rodent is positioned to be killed by a rodent-killing means, specifically in the preferred case, a blade and cooperating ridge, as in U.S. Pat. No. 4,363,184. The relatively movable elements of the trap are held in a set position by the cooperation of the narrow elongated transversely extending trigger element with first and second stop means connected respectively to the movable elements and engaging the narrow elongated transversely extending element at closely adjacent locations spaced from each other a distance at least equal to the thickness of the narrow elongated element.

The trigger element is coated with a bait substance such as cheese or peanut butter. The rodent will gnaw through the coated trigger element in most cases within thirty to ninety seconds. When the rodent gnaws through the narrow elongated element, the relatively movable elements of the trap are moved in a predetermined direction by urging means, preferably an elastic band, to kill the rodent. The stop means overlap each other when this occurs, and a part of the gnawed-through narrow elongated element falls between the overlapping stop means.

Further details, advantages and objects of the invention will be apparent from the following detailed description when read in conjunction with the drawings.

BRIEF DESCRIPTION OF THE DRAWINGS

FIG. 1 is a top plan view of a trap in accordance with the invention, shown in the condition in which it is removed from an injection mold;

FIG. 2 is a side elevation of the trap of FIG. 1;

DETAILED DESCRIPTION

Figure 4:
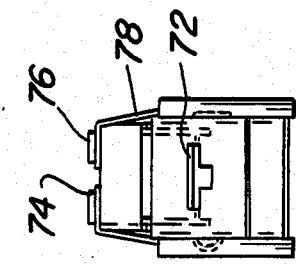
FIG. 4 is an elevational end view of the trap, as seen from the right-hand side of FIG. 3.

As shown in FIGS. 1 and 2, the trap of the invention comprises parts 8 and 10, which are hinged together at 12 so that they close on each other in clamshell fashion. Part 8 is a bottom part of the trap, which will normally rest on a floor or other surface, while part 10 is a movable top part of the trap. These two parts are molded together as a unit in an injection mold, and hinge 12, which is of the type commonly known as a "live" hinge is formed in the molding process.

The trap is preferably molded from polyethylene or polypropylene. However, various other synthetic polymers can be used. The trap material can be transparent, opaque or semi-opaque.

Part 8 has a floor 14 and parallel tapered side walls 16 and 18 extending upwardly from the floor. A short, sloping end wall 20 is provided at the hinge location, and a vertical end wall 22 is provided at the opposite end of part 8.

Part 10 comprises a wall 24, which serves as a top wall when the trap is closed. Side walls 26 and 28 extend upwardly from wall 24. These side walls are parallel to each other and to side walls 16 and 18 of the bottom part. However, they are spaced closer together than are side walls 16 and 18 so that, when the trap is closed, they fit between side walls 16 and 18 with very little clearance. Side walls 16 and 18 are tapered toward the hinge from an intermediate location along the length of part 10.

As shown in FIG. 1, wall 24 has an entrance opening 30 located near the hinge where the side walls of part 10 are tapered. The tapering of the side walls of part 8 causes the hinge to be located close to bottom wall 14. Therefore the rodent can very easily enter the trap through the entrance. An end wall 32 is formed at the end of part 10 opposite the entrance opening.

A blade 34 extends perpendicularly from wall 24. A ridge 36 is formed on bottom wall 14 of part 8. Blade 34 and ridge 36 are both the same distance from hinge 12 so that when element 10 is closed on element 8, blade 34 and ridge 36 oppose each other. A compartment 38, which can be used to hold an additional quantity of bait, is formed adjacent to end wall 22 in part 8. Side wall 18 is provided with a recess at 40, and a notch 42 is formed at the bottom of the recess. Side wall 16 of part 8 is similarly recessed and provided with a notch 44. Floor 14 of part 8 is provided with a well at 46 extending from side wall 16 to side wall 18 at a location below the notches. It will be seen that the purpose of well 46 is to receive projections on the upper part 10 of the housing and parts of a transversely extending trigger member, when the trigger member is chewed through by a rodent and the trap operates.

Ribs are formed adjacent to the notches at 48, 50, 52 and 54 to protect the trigger member from damage.

Projections 56 and 57 extend upwardly from the edges of side walls 28 and 26 respectively. These projections are located slightly inward with respect to the side walls to provide clearance for the parts of the trigger member when the trap operates. Projections 56 and 57 are reinforced by an integrally formed reinforcing baffle 58 which extends between them. This reinforcing baffle also serves to prevent the rodent from reaching bait in compartment 38 without chewing through the trigger member. The upper end of projection 57 is notched at 60, and projection 56 has a similar notch.

The trigger member 62 extends outwardly, between protective ribs 52 and 54, from side wall 18 of part 8, and is preferably molded as a unit with parts 8 and 10. Trigger member 62 comprises a first wide section 64, a narrow elongated trigger element 68, and a wide end section 66. Section 64 is preferably slightly wider than notches 42 and 44 in the horizontal direction, but the entire trigger member 62, including its end sections, is very thin in the vertical direction so that it can be easily bent and gnawed through. It is preferably around 1/32 inch thick in the vertical direction. The narrow elongated trigger element 68 can be positioned to extend across part 8 of the trap between notches 42 and 44. End section 66 is made somewhat longer than end section 64 to allow it to be gripped easily by the fingers to facilitate setting of the trap.

Preferably, the length of trigger element 68 is such that when it is placed in the notches, it is held in tension. Tension is maintained in trigger element 68 by the engagement of the inner ends of sections 64 and 66 with the outer surfaces of side walls 16 and 18 at the locations of the notches. Maintaining tension in trigger element 68 makes it possible for the trigger element to be extremely narrow and easily gnawed through by a rodent, and nevertheless hold the upper element 10 of the trap firmly in its set condition.

A handle comprising strip 70 having a widened head 72, extends outwardly from end wall 22 of part 8. The handle is preferably molded as a unit with parts 8 and 10, and can be used to handle a trap with a dead rodent inside during disposal.

Figure 3:
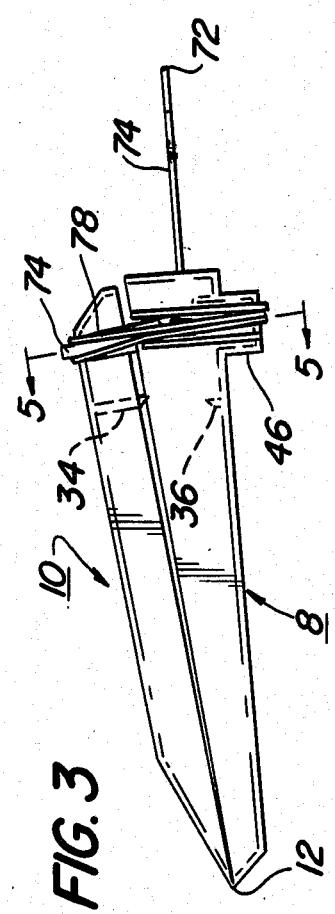
FIG. 3 is a side elevation, showing the trap in a set condition.

As shown in FIG. 4, part 10 is provided with projections 74 and 76 on its wall 24. These projections retain a rubber band 78 which, as shown in FIG. 3, is looped around projections 74 and 76, and extends around the body of the trap between ribs 48 and 50 and between ribs 52 and 54. This rubber band urges part 10 downwardly so that blade 34 approaches ridge 36.

Figure 5:
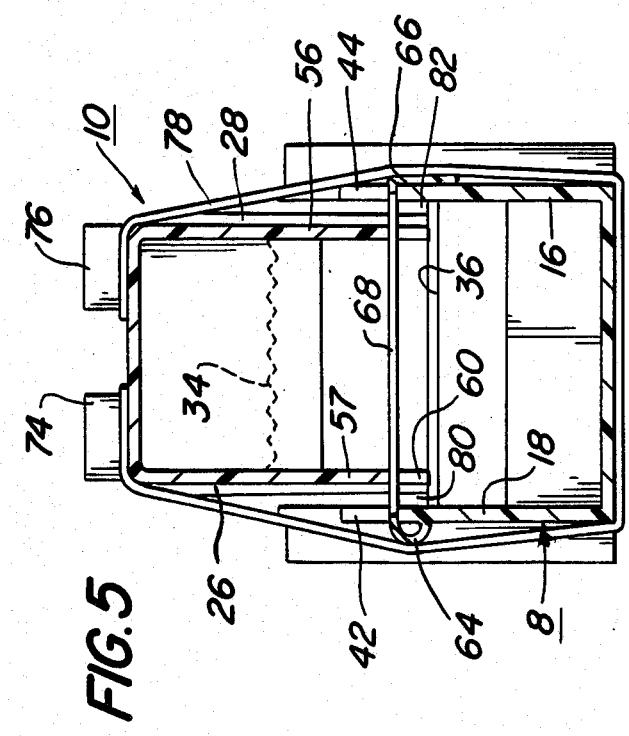
FIG. 5 is a sectional view of the trap taken on plane 5—5 indicated in FIG. 3.

As shown in FIG. 5, section 64 of trigger member 62 is bent on itself, and the elongated trigger element 68 extends between notches 42 and 44. Projections 56 and 57, which extend downwardly from element 10 of the trap, engage trigger element 68 so that part 10 is held in a set position with blade 34 spaced sufficiently from ridge 36 that a rodent can reach and gnaw on the bait-coated trigger element 68. Section 66 at the opposite end of the trigger element is bent downwardly and held against the wall of the trap by the rubber band. If the trigger element is sufficiently thin, i.e. around 1/32 inch or less, the polymer will crease when bent, allowing the end section 66 to fold flat against the outside of the trap. End section 64 of the trigger element is also close to the outside of the trap, and in some cases may also be held flat against the trap wall by the rubber band. The flexibility of the end sections of the trigger element allows the rubber band to remain between ribs 48 and 50 and between ribs 52 and 54, minimizing the likelihood that the rubber band will be gnawed through by a rodent inspecting the exterior of the trap.

With the trap in this set condition, trigger element 68 is spaced from blade 34 and its opposed ridge 36 by a distance such that the rodent's neck is between the blade and ridge while the rodent is gnawing on the trigger element. Projection 57 is spaced from the inner surface of wall 18 so that a gap 80 is provided. This gap is slightly wider than the vertical dimension of trigger element 68, but preferably not more than approximately three times said vertical dimension. A similar gap is provided at 82 between projection 56 and the inner surface of side wall 16. These gaps allow the parts of the trigger element, when gnawed through, to fall between the projections of part 10 and the side walls of part 8 when the trigger element is gnawed through and the trap is triggered as shown in FIG. 6.

When the trap is in the set condition, as in FIG. 5, trigger element 68 is in tension, and projections 56 and 57 extending downwardly from upper trap member 10 are close to side walls 16 and 18, being spaced therefrom by a distance only slightly greater than the vertical dimension of trigger element 68. Therefore, the upper element 10 of the trap is securely held in the set position. Although there is a slight tendency for the trigger element to stretch, such stretching results in very limited and insignificant movement of part 10 toward part 8. The stretching is insignificant because of the close proximity of projections 56 and 57 to notches 44 and 42 respectively.

Figure 6:
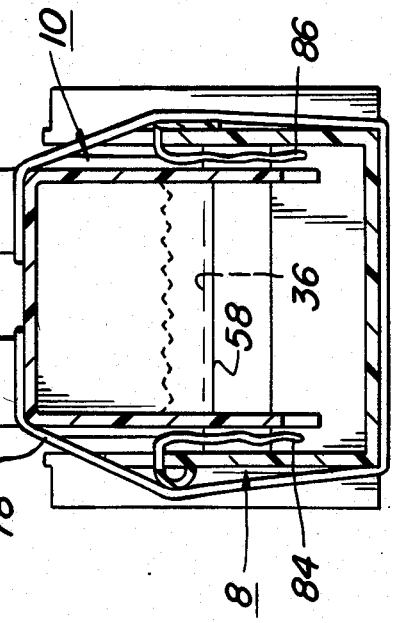
FIG. 6 is a similar sectional view showing the trap in its triggered condition.

When the elongated part 68 of the trigger element is gnawed through by the rodent, parts 84 and 86 separate from each other, as shown in FIG. 6, allowing part 10 of the trap to fall into part 8. The force exerted by rubber band 78 causes this to occur very quickly, and brings blade 34 down toward ridge 36, immediately killing the rodent. The rodent is substantially completely enclosed within the trap, and the rodent and trap can be conveniently thrown away.

As will be apparent from the foregoing description, the trigger element only releases the trap from its set condition when it is gnawed through by the rodent. The trap is not subject to triggering by vibrations, temperature changes or movements by a rodent on the exterior of the trap. Furthermore, the trigger can be easily set simply by bending the trigger member 62 and placing it in the notches in the lower element 8 of the trap. The upper element 10 of the trap is then brought around until its projections 56 and 57 engage the narrow trigger element 68. The rubber band is then positioned as shown in FIG. 3, and the trap is set. All of this is easily accomplished, and requires only a minimum of manual dexterity.

Because the trap is almost impossible to trigger unless a rodent is inside it, if the trap is found in its triggered condition, it is nearly certain that it contains a dead rodent. Consequently it is not necessary to view the dead rodent through a transparent or semi-transparent trap housing. The housing, therefore, can be and preferably is, made of opaque material.

The trap, as shown in FIG. 2, has a very low profile, and is consequently capable of being injection molded readily using comparatively inexpensive dies.

The trap operates reliably in cold weather conditions for two principal reasons. First, as in the case of my U.S. Pat. No. 4,363,184, the rubber band is remote from the hinge. Therefore, stiffening of the hinge in cold weather will not hinder its operation. Secondly, because the trigger element is designed to release the upper element of the trap only when gnawed through by the rodent, the trigger is not sensitive to temperature changes and will not trigger accidentally as a result of contraction in cold weather.

Numerous modifications can be made to the trap as herein described. For example, while the trigger member is preferably molded as a unit with the principal elements of the trap, this is not necessarily the case. A separate trigger element can be used. In fact, a separate trigger element may be preferred if the trap is to be reused. The trigger element, although preferably designed so that it is held in tension between the side walls of the lower part 8 of the trap, can be made rigid if desired, and if so made, can hold the trap in its set condition without being stretched. The trap can be modified with respect to the location of its entrance opening, the nature of the means urging the trap elements together, the nature and configuration of the killing elements, the position of the rubber band, and in many other respects without departing from the scope of the invention as defined in the following claims.

I claim:

1. A portable, disposable rodent trap comprising: first and second relatively movable members; means applying a force to said relatively movable members for urging said members so that one member moves in a predetermined direction relative to the other; rodent-killing means operatively connected to said first and second members for killing a rodent when said members move in said predetermined direction; and releasable means for holding said relatively movable members against the force of said urging means; characterized by the fact that the releasable means comprises a narrow elongated element extending transversely in relation to said predetermined direction at a location such that it can be gnawed through by a rodent positioned to be killed by said rodent-killing means, first stop means connected to the first relatively movable member and engaging the narrow elongated element at a first location, second stop means connected to the second relatively movable member and engaging the narrow elongated element at a second location closely adjacent to said first location, but spaced therefrom, along the length of said narrow elongated element, by a distance at least equal to the thickness of the narrow elongated element, said first and second stop means being positioned to overlap each other when said one of the relatively movable members moves in said predetermined direction relative to the other, and further characterized by means for supporting said narrow elongated element at at least one additional location remote from said first and second locations, and preventing movement of the narrow elongated element at said remote location in directions transverse to the direction of elongation thereof.

2. A trap according to claim 1 in which at least one of said stop means has a notch receiving said narrow elongated element.

3. A trap according to claim 1 in which the narrow elongated element is flexible, in which said second location is between said first location and said at least one additional location, in which the first stop means has a notch, receiving said narrow elongated element, and in which said narrow elongated element has an enlarged end on the side of said notch remote from said second location, said enlarged end preventing the narrow elongated element from being pulled through said notch in a direction toward said at least one additional location as a result of the force exerted on said flexible narrow elongated element by the urging means through the stop means.

4. A trap according to claim 3 in which said supporting means holds the narrow elongated element against movement toward said notch, the length of the narrow elongated element is such that the narrow elongated element is held in tension between said notch and said supporting means.

5. A trap according to claim 1 in which said means for supporting said narrow elongated element at said at least one additional location comprises a third stop means connected to the first relatively movable member and engaging the narrow elongated element at a third location remote from said first and second locations, and fourth stop means connected to the second relatively movable member and engaging the narrow elongated element at a fourth location closely adjacent to said third location but spaced therefrom, along the length of said narrow elongated element, by a distance at least equal to the thickness of the narrow elongated element, said third and fourth stop means being positioned to overlap each other when said one of the movable members moves in said predetermined direction relative to the other.

6. A trap according to claim 1 in which said first and second relatively movable members and said narrow elongated element are molded of synthetic polymeric material and in which said narrow elongated element and at least one of said first and second relatively movable members are molded together as a unit.

7. A trap according to claim 1 in which said first and second relatively movable members are hinged to each other and together form an enclosure having a rodent entrance opening, and in which the rodent-killing means comprises a blade within the enclosure remote from the entrance opening and an opposed means cooperable with the blade to choke the neck of a rodent within the enclosure, the blade being attached to and movable with said first relatively movable member and said opposed means being attached to and movable with said second relatively movable member.

8. A trap according to claim 1 in which the first relatively movable member has a wall with a well formed therein and positioned to receive said second stop means when the first and second relatively movable members move toward each other upon operation of said releasable means.

9. A trap according to claim 1 in which the first relatively movable member has a wall with a well formed therein and positioned to receive parts of said narrow elongated element when said elongated element is gnawed through by a rodent.

10. A trap according to claim 1 having two opposite ends, a bait compartment at one end and an entrance opening at the opposite end, and having baffle means for preventing a rodent from reaching the bait compartment without gnawing through said narrow elongated element.

* * * * *